(12) United States Patent (10) Patent No.: US 8,783,429 B2
Moore (45) Date of Patent: Jul. 22, 2014

(54) HYDRAULIC BRAKE DEVICE FOR A BICYCLE

(71) Applicant: Wayne-Ian Moore, Changhua County (TW)

(72) Inventor: Wayne-Ian Moore, Changhua County (TW)

(73) Assignee: Ashima Ltd., Changhua County (TW)

( * ) Notice: Subject to any disclaimer, the term of this patent is extended or adjusted under 35 U.S.C. 154(b) by 57 days.

(21) Appl. No.: 13/706,354

(22) Filed: Dec. 6, 2012

(65) Prior Publication Data

US 2014/0158487 A1 Jun. 12, 2014

(51) Int. Cl.
*B60T 11/00* (2006.01)

(52) U.S. Cl.
USPC ........................................ 188/344; 188/24.22

(58) Field of Classification Search
USPC ....... 188/344, 24.22, 2 D, 151 R, 196 A, 352, 188/353, 357–360; 60/584, 585, 592; 74/501.5 H, 551.8
See application file for complete search history.

(56) References Cited

U.S. PATENT DOCUMENTS

| 6,804,961 | B2* | 10/2004 | Lumpkin | 60/588 |
| 7,497,309 | B2* | 3/2009 | Chen | 188/344 |
| 7,757,821 | B2* | 7/2010 | Tetsuka et al. | 188/26 |
| 7,857,112 | B1* | 12/2010 | Tsai et al. | 188/344 |
| 8,342,305 | B2* | 1/2013 | Moore | 188/344 |

* cited by examiner

*Primary Examiner* — Pamela Rodriguez (57) ABSTRACT

A hydraulic brake device for a bicycle includes a holder, a chamber member and two side oil tubes, the holder assembled with the bicycle, the chamber member assembled to the holder and having two oil tanks, each oil tank having an operating bar movably received therein, the brake cable connected with the operating bar, each oil tank having a brake oil drain and a side oil hole, a distance being defined between each brake oil drain and each corresponding side oil hole, each brake oil drain and each side oil hole communicating with the chamber member, each brake oil drain assembled to a brake hose and communicating with a brake system of the bicycle, the chamber member having two assembling grooves, two ends of each side oil tube assembled to each corresponding side oil hole and each corresponding assembling groove respectively.

9 Claims, 11 Drawing Sheets

HYDRAULIC BRAKE DEVICE FOR A BICYCLE

BACKGROUND OF THE INVENTION

1. Field of the Invention

The present invention relates to a brake device for a bicycle, and more particularly to a hydraulic brake device for a bicycle.

2. Description of Related Art

A conventional hydraulic brake device for a bicycle comprises a controlling unit, a hydraulic unit and a brake unit, the controlling unit comprising at least one brake cable and at least one driving axle, one end and another end of each brake cable connected to a brake lever and one end of each corresponding driving axle respectively, the hydraulic unit comprising an oil tank, at least one push stick, at least one piston, at least one elastic member and at least one oil tube, each driving axle pivotally assembled to the oil tank, one end of each push stick connected to another end of each corresponding driving axle so as to be driven by said driving axle, the oil tank having at least one receiving space so as to movably receive the at least one piston and the at least one elastic member, another end of each push stick abutted against one end of each corresponding piston, another end of each piston abutted against one end of each corresponding elastic member, another end of each elastic member abutted against an inner face of the oil tank, one end of each oil tube communicating with a lateral side of the oil tank which is adjacent to the inner face of the oil tank, the brake unit connected to another end of each oil tube, the brake unit comprising a pair of main pistons, a pair of brake pads and a brake disc, the brake disc being positioned between the two main pistons, the two main pistons communicating with another end of the oil tubes, each brake pad being defined between each corresponding main piston and the brake disc. Under this arrangement, when a rider presses the brake lever so as to pull the brake cables and drive the driving axles moving toward the brake cables; then, the push sticks are moved to push the pistons and compress the elastic members through the motion of the driving axles; thereby, a volume of oil in the oil tank flows into the main pistons via the oil tubes, so that the two main pistons move toward the brake disc; meanwhile, the two brake pads move toward the brake disc and contact with the brake disc; as a result, the bicycle is braked.

However, the conventional hydraulic brake device for a bicycle has two disadvantages as following.

Firstly, because each push stick pivots on each corresponding driving axle so as to push each corresponding piston, the piston cannot move smoothly and straightforwardly in the oil tank; as a result, the performance of the brake effect is worse.

Secondly, when the brake lever is released, the elastic members quickly bounce back to push the pistons resile; however, the oil flows slowly from the brake unit to the oil tank, so that the motion of the pistons cannot synchronize with the flow rate of the oil. Under this arrangement, if the brake device has to be actuated repeatedly, the brake effect cannot be performed completely because of the unsynchronization between the motion of the pistons and the flow rate of the oil.

The present invention has arisen to mitigate and/or obviate the disadvantages of the conventional.

SUMMARY OF THE INVENTION

The main objective of the present invention is to provide an improved hydraulic device for a bicycle.

To achieve the objective, a hydraulic device for a bicycle which is assembled to a bicycle and is connected to a brake lever via a brake cable comprises a holder, a chamber member and two side oil tubes, the holder assembled with the bicycle, the chamber member assembled to the holder and having two oil tanks defined therein, each oil tank having an operating bar movably received therein, the brake cable connected with the operating bar so as to drive the operating bar, each oil tank having a brake oil drain and a side oil hole, a distance being defined between each brake oil drain and each corresponding side oil hole, each brake oil drain and each side oil hole communicating with a lateral side of the chamber member, each brake oil drain assembled to a brake hose and communicating with a brake system of the bicycle, the chamber member having two assembling grooves defined at a periphery thereof, two ends of each side oil tube assembled to each corresponding side oil hole and each corresponding assembling groove respectively. Wherein, the holder has an enclosing portion and a fastening portion defined at one end thereof and another end thereof respectively; the enclosing portion of the holder sleeves on a bicycle tubing and is secured between two adjusting members; the chamber member is assembled to the fastening portion of the holder; each oil tank has a first segment and a second segment defined therein; each operating bar has a first portion and a second portion defined thereon; the first portion and the second portion of each operating bar are slidably assembled in the first segment and the second segment of each corresponding oil tank respectively; each side oil hole communicates with the second segment of each corresponding oil tank; each brake oil drain communicates with the first segment of each corresponding oil tank; a fixing assembly is assembled onto the chamber member; the fixing assembly comprises two caps and a blocking member; one end of each cap is assembled to the second segment of each corresponding oil tank; the blocking member is assembled to one end of the chamber member; the blocking member has two pores opened therethrough; another end of each cap is respectively inserted into each corresponding pore of the blocking member; the chamber member further comprises an oil storage room; an oil outlet and an oil return hole are opened at a lateral side of each oil tank; the oil outlets and oil return holes communicate with the oil storage room; a film member covers an opening of the oil storage room; the film member is defined between the fastening portion of the holder and the chamber member; the oil inlet is defined at a lateral side of the chamber member; the oil inlet communicates with the oil storage room; an oil seal is assembled to the oil inlet; a plurality of U-shaped portions is extruded from the film member toward the oil storage room; each oil tank has a tubing member assembled thereon; each brake cable passes through each corresponding tubing member to assemble with each corresponding operating bar; each operating bar has a through hole axially opened thereon; the brake cable is inserted into the through hole from one end of each operating bar and is fastened with another end of each operating bar.

Further benefits and advantages of the present invention will become apparent after a careful reading of the detailed description with appropriate reference to the accompanying drawings.

DETAILED DESCRIPTION OF THE INVENTION

Referring to FIGS. 1-4 and FIGS. 6-7, a hydraulic brake device for a bicycle in accordance with the present invention which is assembled to a bicycle 1 and is connected to a brake lever 11 via a brake cable 12 comprises a holder 2, a chamber member 3, a film member 4 and two side oil tubes 5.

The holder 2 is assembled with the bicycle 1. The holder 2 has an enclosing portion 21 and a fastening portion 22 defined at one end thereof and another end thereof respectively. The enclosing portion 21 of the holder 2 sleeves on a bicycle tubing (In a preferred embodiment, the enclosing portion 21 sleeves on a fork terminal 13 of the bicycle 1.) and is secured between two adjusting members 23 which also sleeve on the bicycle tubing.

Figure 7:
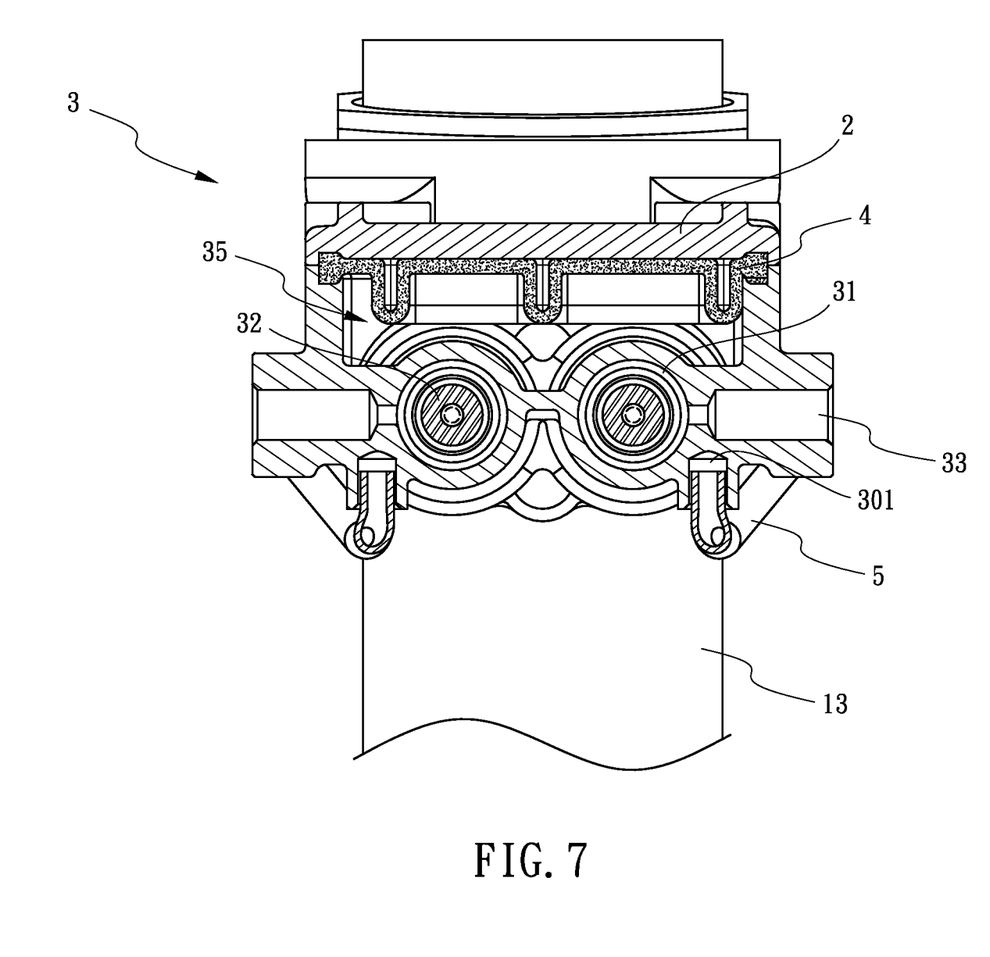
FIG. 7 is a cross-sectional view along line 7-7 shown in FIG. 4.
Figure 8:
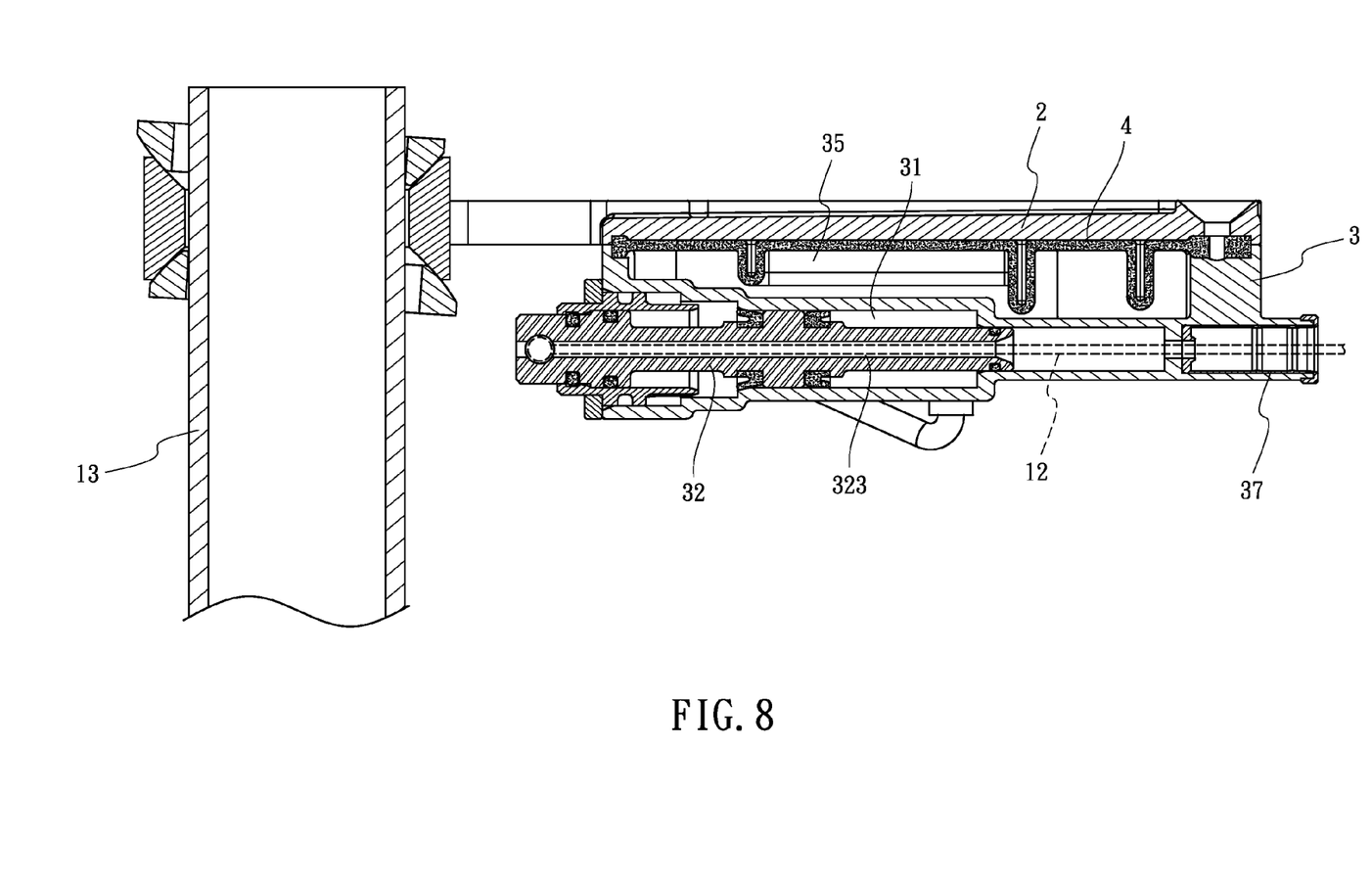
FIG. 8 is a cross-sectional view along line 8-8 shown in FIG. 4.
Figure 9:
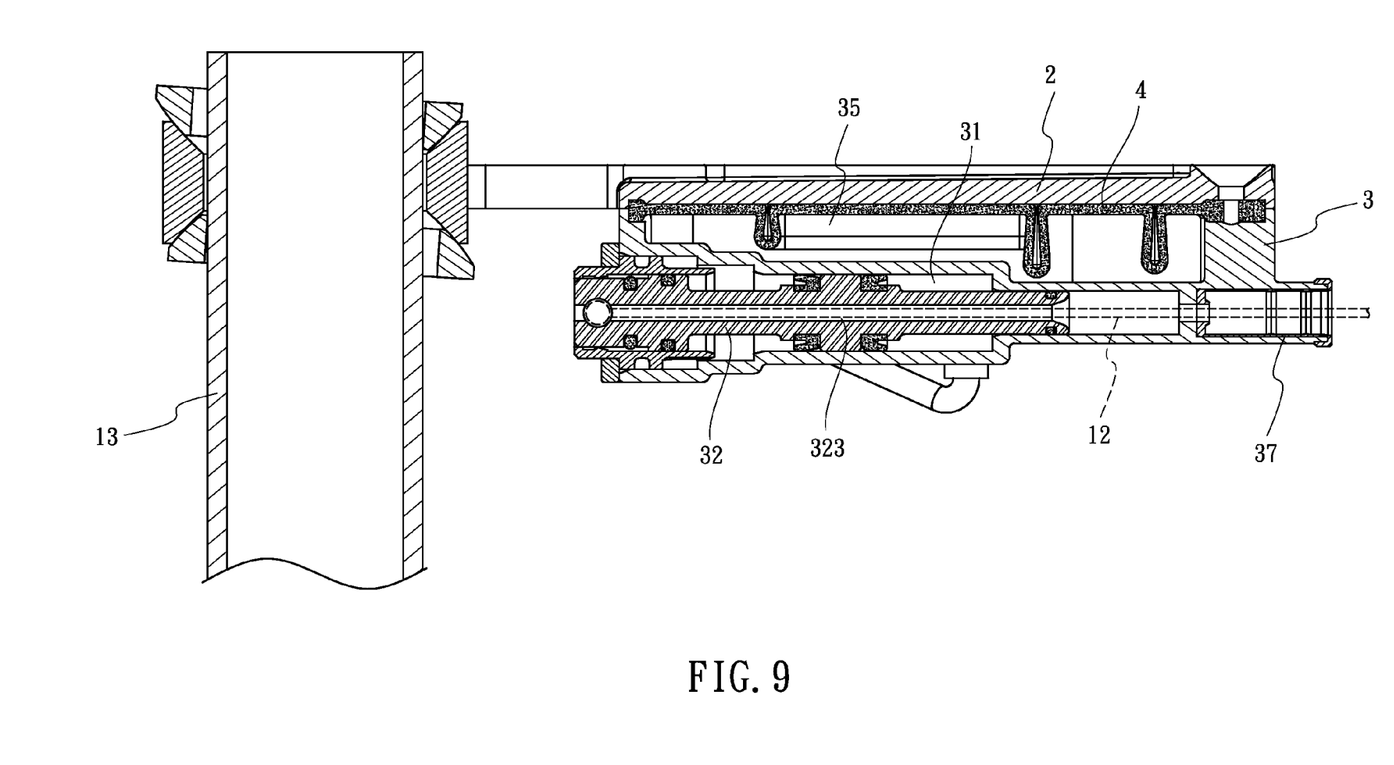
FIG. 9 is an operational view for showing that a brake cable drives a motion of an operating bar.

The chamber member 3 is assembled to the holder 2 and having two oil tanks 31 defined therein. Each oil tank 31 has an operating bar 32 movably received therein. The brake cable 12 connects with the operating bar 32 so as to drive the operating bar 32. Each oil tank 31 has a brake oil drain 33 and a side oil hole 34. A distance is defined between each brake oil drain 33 and each corresponding side oil hole 34. Each brake oil drain 33 and each side oil hole 34 communicate with a lateral side (not numbered) of the chamber member 3. Each brake oil drain 33 is assembled to a brake hose 14 and communicating with a brake system 15 of the bicycle 1. As shown in FIG. 7, the chamber member 3 has two assembling grooves 301 defined at a periphery thereof for receiving the two side oil tubes 5 respectively. In a preferred embodiment, the two assembling grooves 301 are defined at a bottom side of the chamber member 3. Another distance is defined between the two assembling grooves 301.

The chamber member 3 is assembled to a bottom of the fastening portion 22 of the holder 2. Each oil tank 31 further has a first segment 311 and a second segment 312 defined therein. Each operating bar 32 has a first portion 321 and a second portion 322 defined thereon. The first portion 321 and the second portion 322 of each operating bar 32 are slidably assembled in the first segment 311 and the second segment 312 of each corresponding oil tank 31 respectively. Each side oil hole 34 communicates with the second segment 312 of each corresponding oil tank 31. Each brake oil drain 33 communicates with the first segment 311 of each corresponding oil tank 31. Each operating bar 32 further has a through hole 323 axially opened thereon. The brake cable 12 is inserted into the through hole 323 from one end of each operating bar 32 and is fastened with another end of each operating bar 32.

The chamber member 3 further comprises an oil storage room 35. An oil outlet 351 and an oil return hole 352 are opened at a lateral side of each oil tank 31. The oil outlets 351 and oil return holes 352 communicate with the oil storage room 35. The film member 4 covers an opening of the oil storage room 35. The film member 4 is defined between the fastening portion 22 of the holder 2 and the chamber member 3. A plurality of U-shaped portions 41 is extruded from the film member 4 toward the oil storage room 35.

Two ends of each side oil tube 5 are assembled to each corresponding side oil hole 34 and each corresponding assembling groove 301 respectively.

Referring to FIG. 6 and FIGS. 8-11, an operation of the present invention is described as following. When a rider presses the brake lever 11 to pull the brake cable 12, the brake cable 12 drives the operating bars 32 to move within the oil tank 31; then, the oil in the first segment 311 of each oil tank 31 are pushed out by the first portion 321 of each corresponding operating bar 32, so that the oil is flowed through each corresponding brake oil drain 33 and the brake hose 14, and is injected into the brake system 15 so as to brake the bicycle 1; moreover, some of the oil in the second segment 312 of each oil tank 31 is pushed out by the second portion 322 of each corresponding operating bar 32, so that the oil is flowed into each corresponding side oil tube 5 via the side oil hole 34; as a result, the rider brakes the bicycle 1 smoothly; when the rider releases the brake lever 11, some of the oil in the brake system 15 is flowed back to the first segment 311 of each oil tank 31 via the brake hose 14 so as to push the first portion 321 of each corresponding operating bar 32 to move back; besides, when the pressure inside the second segment 312 of each oil tank 31 is too high, the oil flows from each second segment 312 to each corresponding side oil tube 5; when the pressure inside each corresponding side oil tube 5 is too high, the oil flows back from each side oil tube 5 to each corresponding second segment 312 of said oil tank 31 so as to balance the pressure between the first segment 311 and the second segment 312 of said oil tank 31, so that each corresponding operating bars 32 moves back smoothly. Moreover, since the two side oil tubes 5 are partially protruded from the present invention, the temperature of the oil inside the two side oil tubes 5 is decreased by the outside airflow, so that the oil flows fluently.

Figure 1:
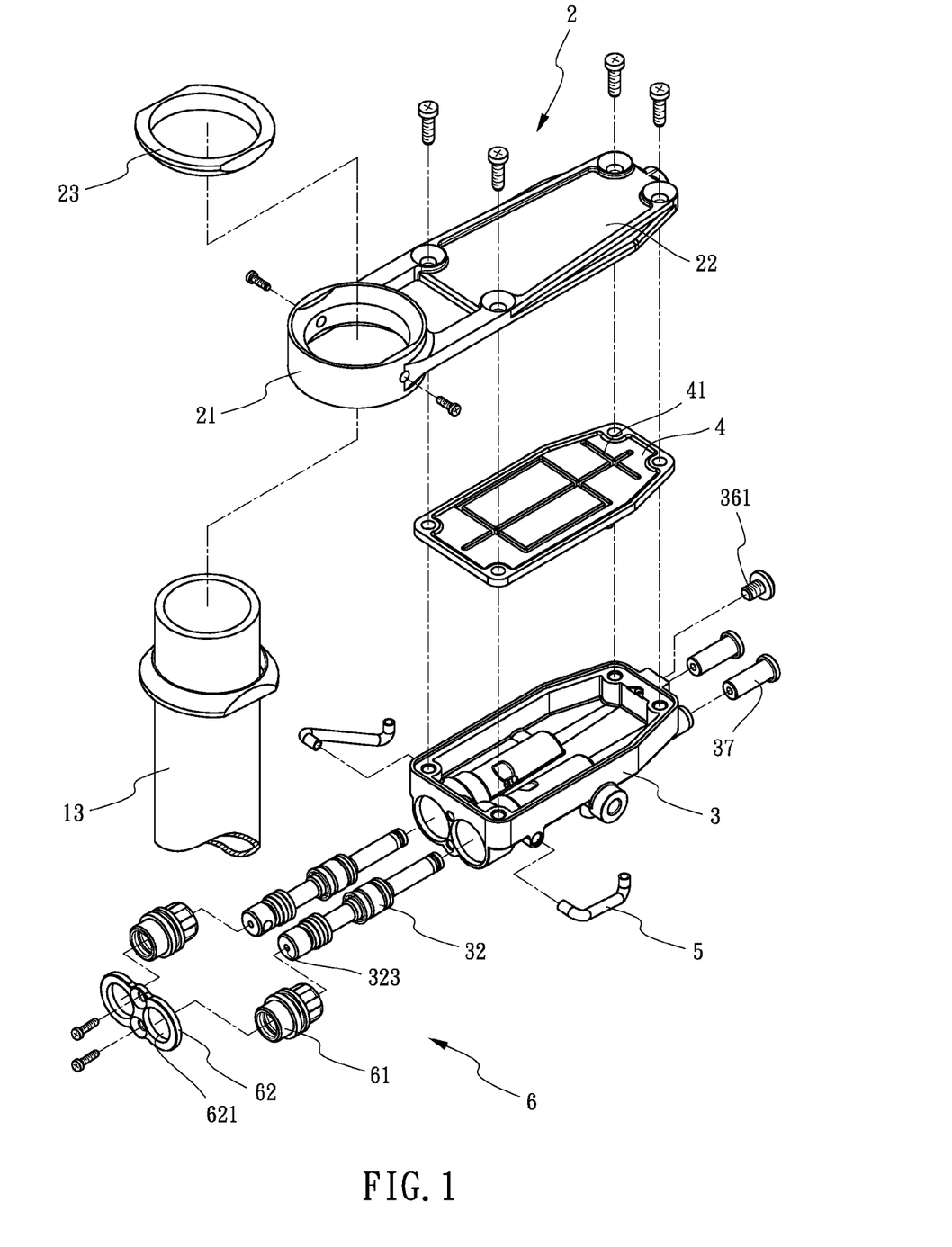
FIG. 1 is an exploded view of a hydraulic brake device for a bicycle of the present invention.
Figure 5:
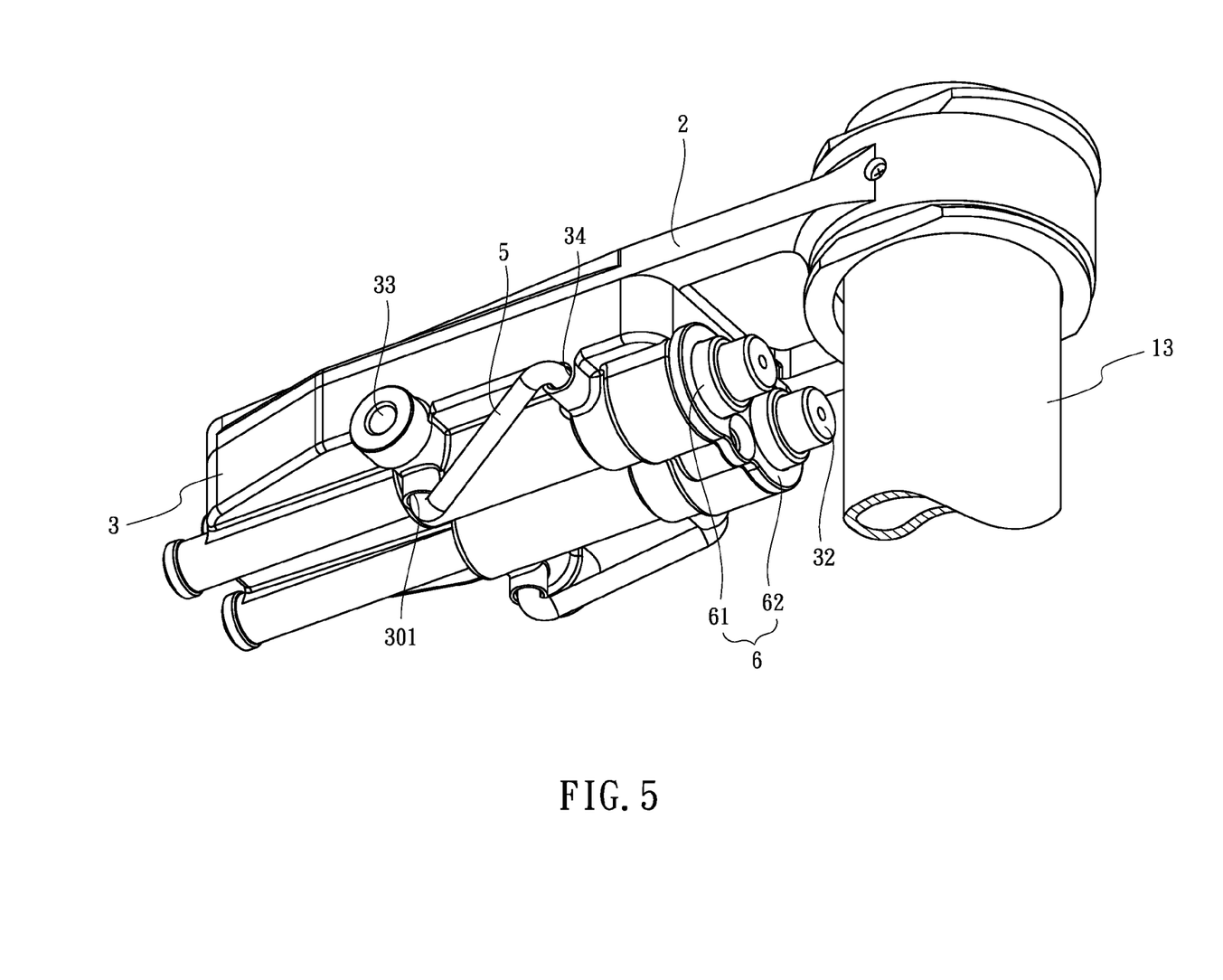
FIG. 5 is another schematic view for showing the present invention is assembled to the fork terminal of the bicycle.
Figure 6:
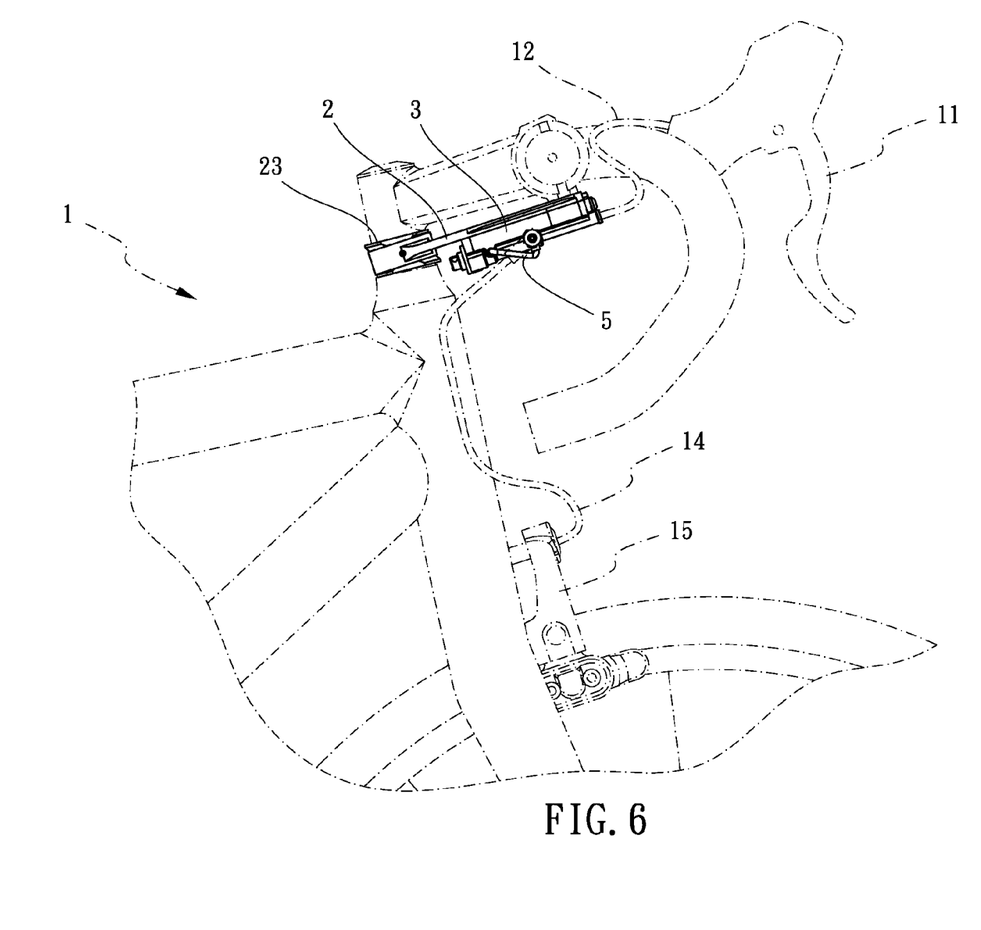
FIG. 6 is a partial side view for showing the present invention is assembled to the bicycle.
Figure 10:
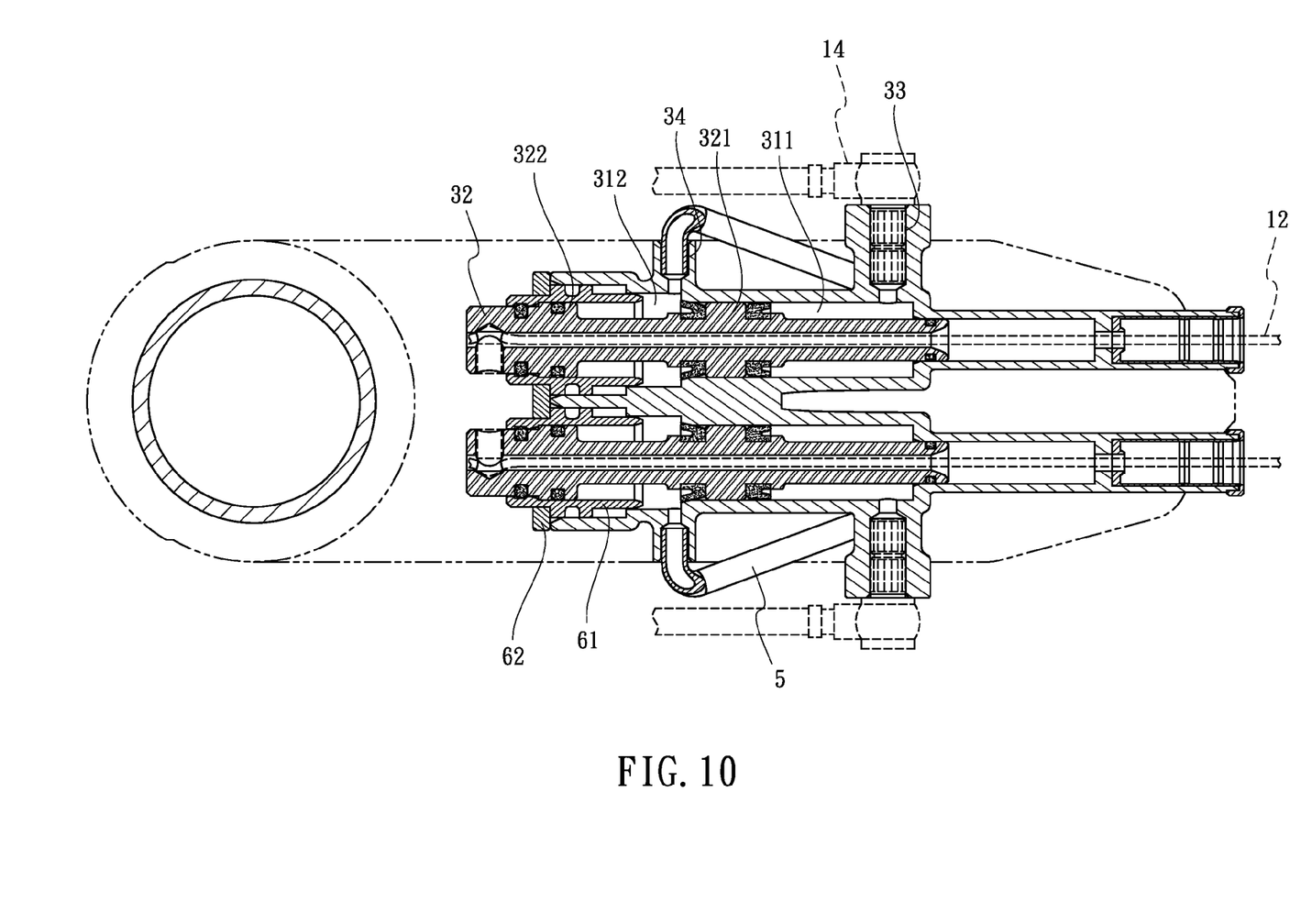
FIG. 10 is a cross-sectional view along line 10-10 shown in FIG. 4.
Figure 11:
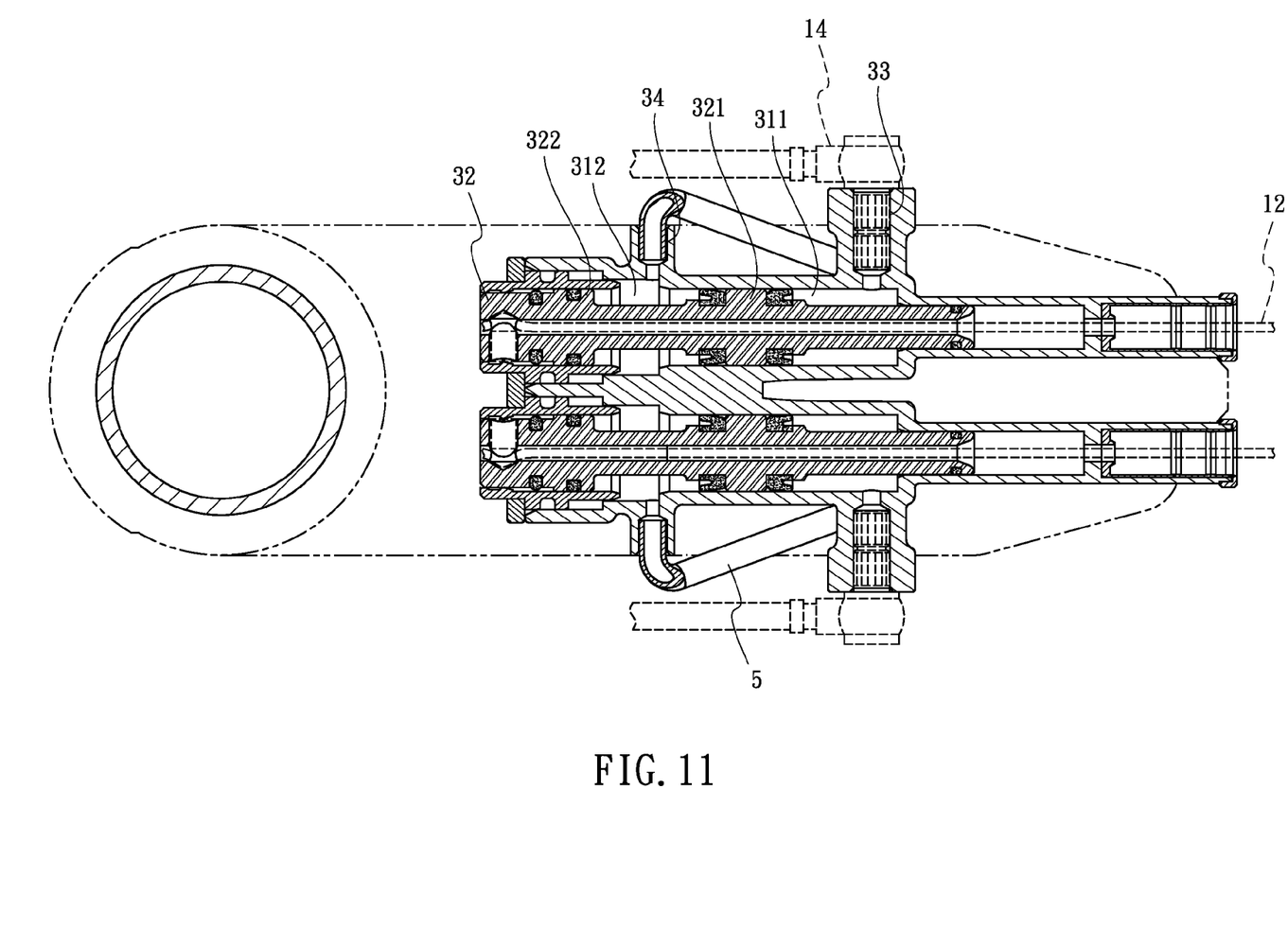
FIG. 11 is an operational view for showing that the two brake cables drive the motions of the two operating bars respectively.

Referring to FIG. 1, FIG. 5 and FIG. 10, the present invention further comprises a fixing assembly 6. The fixing assembly 6 is assembled onto the chamber member 3. The fixing assembly 6 comprises two caps 61 and a blocking member 62. One end of each cap 61 is assembled to the second segment 312 of each corresponding oil tank 31. The blocking member 62 is assembled to one end of the chamber member 3. The blocking member 62 has two pores 621 opened therethrough. Another end of each cap 61 is respectively inserted into each corresponding pore 621 of the blocking member 62. Therefore, each operating bar 32 does not depart from each corresponding oil tank 31 via the second segment 312 of the each corresponding oil tank 31 because of the fixing assembly 6.

Figure 3:
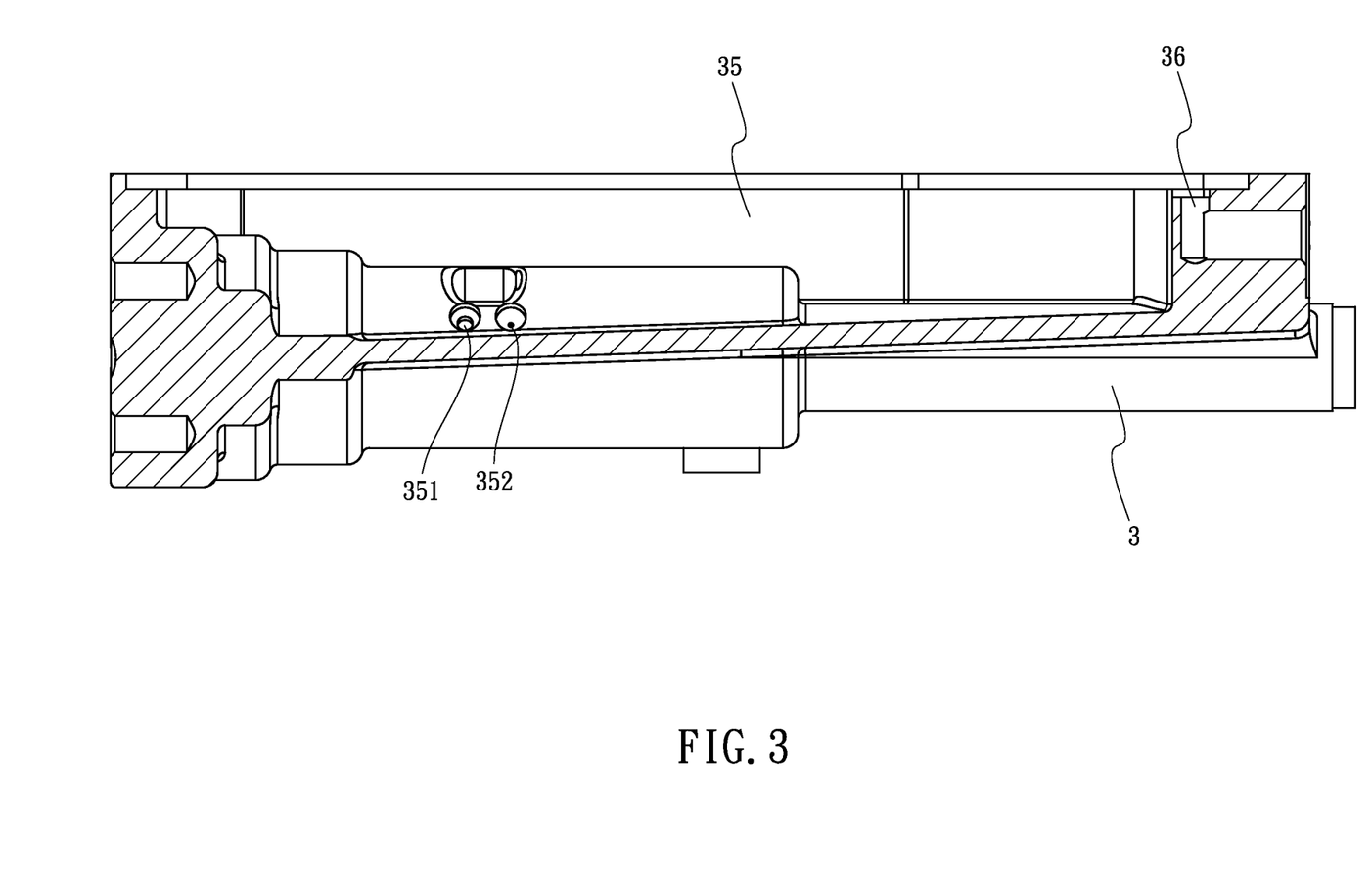
FIG. 3 is a cross-sectional view along line 3-3 shown in FIG. 2.
Figure 4:
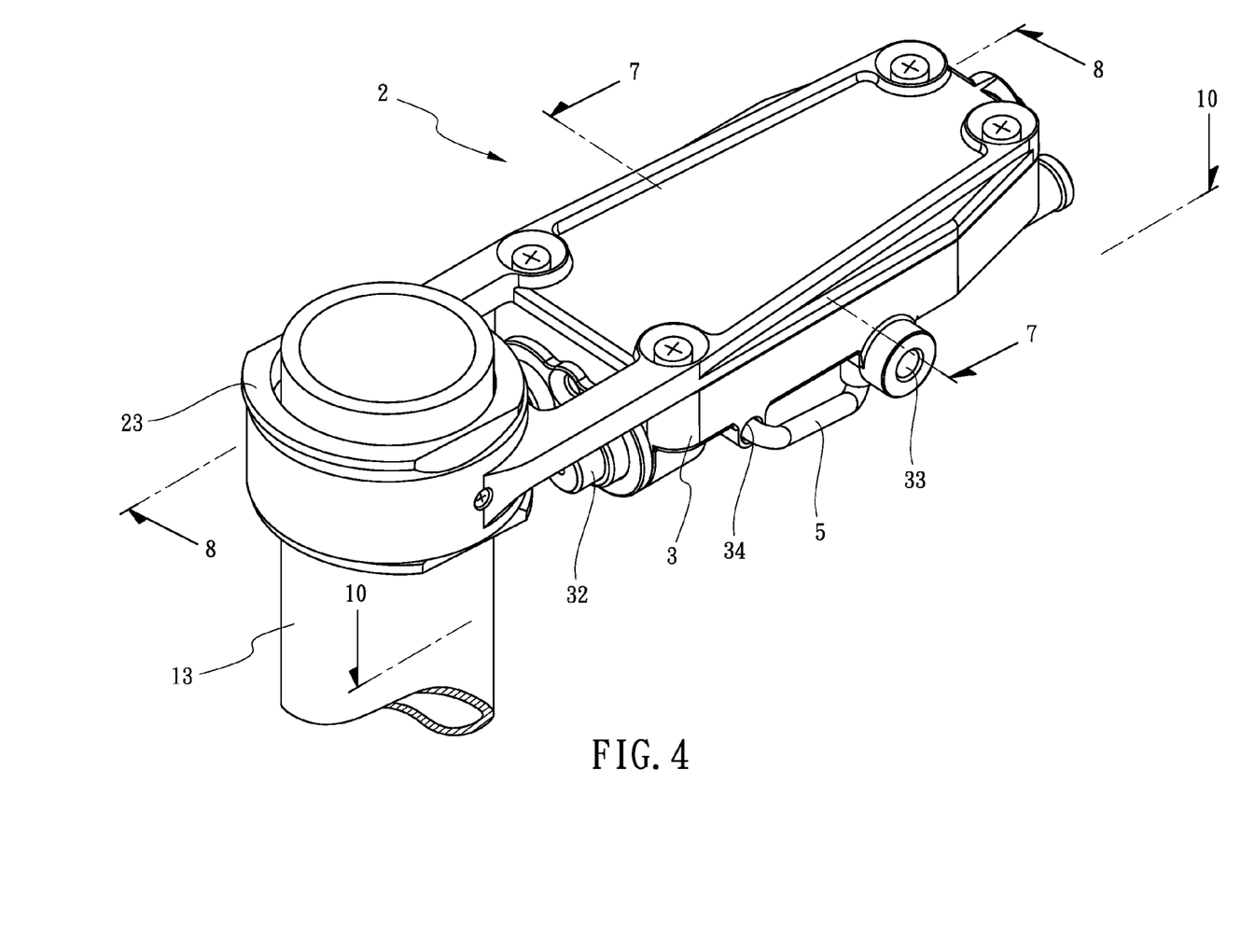
FIG. 4 is a schematic view for showing the present invention is assembled to a fork terminal of a bicycle.

Referring to FIG. 1 and FIG. 3, the chamber member 3 further has an oil inlet 36. The oil inlet 36 is L-shaped and communicating with the oil storage room 35. One end of the oil inlet 36 is defined at a lateral side of the chamber member 3, and another end of the oil let is defined at a top side of the chamber member 3. The oil inlet 36 allows the rider adding oil into the oil storage room 35 via another end thereof. An oil seal 361 is assembled to one end of the oil inlet 36 and is exposed out of the chamber member 3. The oil seal 361 prevents the oil in the oil storage room 35 from leaking out.

Figure 2:
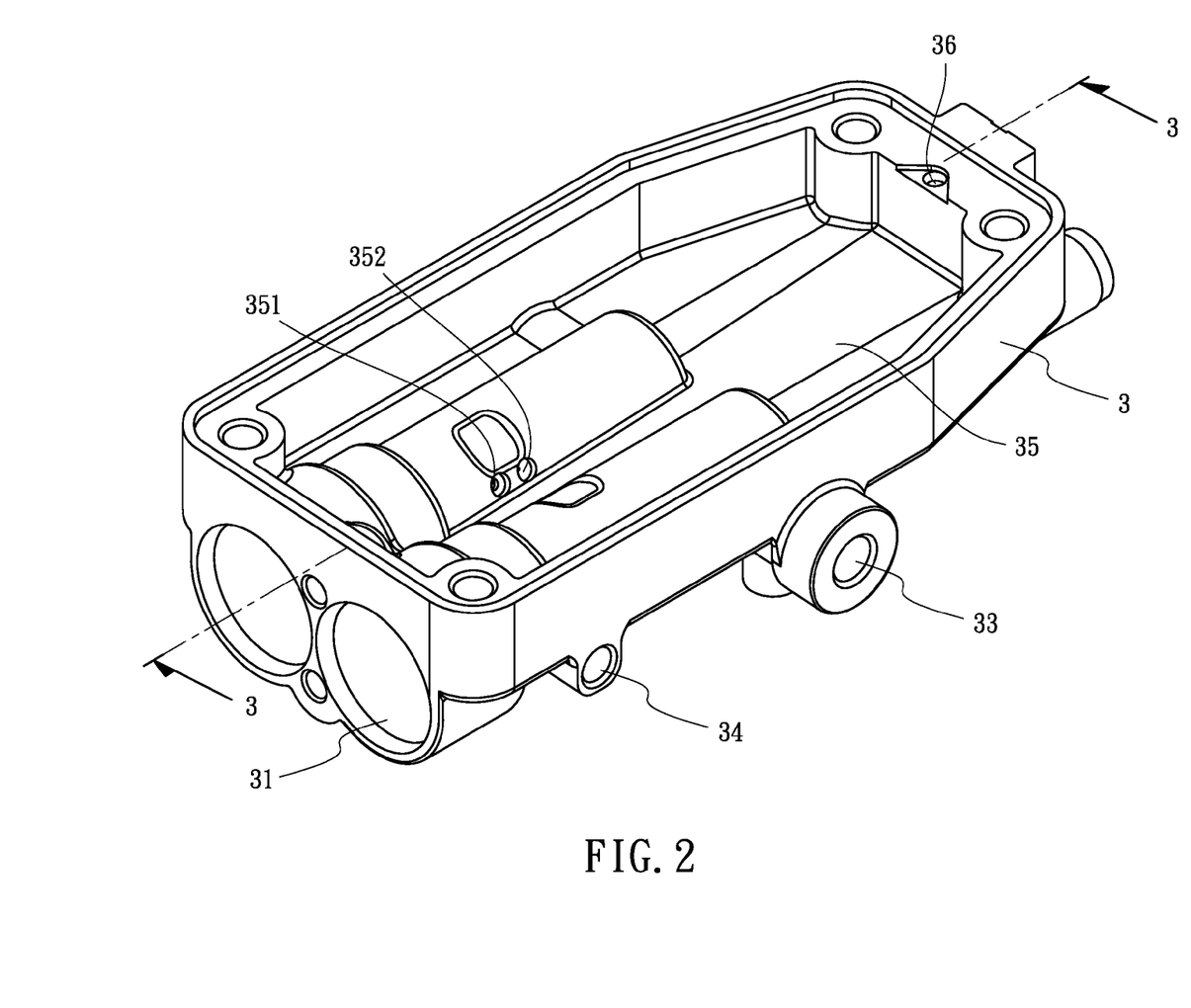
FIG. 2 is a perspective view for showing a chamber member of the present invention.

Furthermore, referring to FIGS. 1-2, each oil tank 31 further has a tubing member 37 assembled thereon. Therefore, each brake cable 12 passes through each corresponding tubing member 37 to assemble with each corresponding operating bar 32, so that the tubing member 37 protects the chamber member 3 from being wearing by the brake cable 12.

Although the invention has been explained in relation to its preferred embodiment, it is to be understood that many other possible modifications and variations can be made without departing from the spirit and scope of the invention as hereinafter claimed.

What is claimed is:

1. A hydraulic brake device for a bicycle which is assembled to the bicycle and is connected to a brake lever via a brake cable comprising:

a holder, a chamber member and two side oil tubes;

the holder assembled with the bicycle; and the chamber member assembled to the holder and having two oil tanks defined therein, each oil tank having an operating bar movably received therein, the brake cable connected with the operating bar so as to drive the operating bar, each oil tank having a brake oil drain and a side oil hole, a distance being defined between each brake oil drain and each corresponding side oil hole, each brake oil drain and each side oil hole communicating with a lateral side of the chamber member, each brake oil drain assembled to a brake hose and communicating with a brake system of the bicycle, the chamber member having two assembling grooves defined at a periphery thereof;

two ends of each side oil tube assembled to each corresponding side oil hole and each corresponding assembling groove respectively.

2. The hydraulic brake device for a bicycle as claimed in claim 1, wherein the holder has an enclosing portion and a fastening portion defined at one end thereof and another end thereof respectively; the enclosing portion of the holder sleeves on a bicycle tubing and is secured between two adjusting members; the chamber member is assembled to the fastening portion of the holder.

3. The hydraulic brake device for a bicycle as claimed in claim 1, wherein each oil tank has a first segment and a second segment defined therein; each operating bar has a first portion and a second portion defined thereon; the first portion and the second portion of each operating bar are slidably assembled in the first segment and the second segment of each corresponding oil tank respectively; each side oil hole communicates with the second segment of each corresponding oil tank; each brake oil drain communicates with the first segment of each corresponding oil tank.

4. The hydraulic brake device for a bicycle as claimed in claim 3, wherein a fixing assembly is assembled onto the chamber member; the fixing assembly comprises two caps and a blocking member; one end of each cap is assembled to the second segment of each corresponding oil tank; the blocking member is assembled to one end of the chamber member; the blocking member has two pores opened therethrough; another end of each cap is respectively inserted into each corresponding pore of the blocking member.

5. The hydraulic brake device for a bicycle as claimed in claim 1, wherein the chamber member further comprises an oil storage room; an oil outlet and an oil return hole are opened at a lateral side of each oil tank; the oil outlets and oil return holes communicate with the oil storage room; a film member covers an opening of the oil storage room; the film member is defined between the fastening portion of the holder and the chamber member.

6. The hydraulic brake device for a bicycle as claimed in claim 5, wherein an oil inlet is defined at a lateral side of the chamber member; the oil inlet communicates with the oil storage room; an oil seal is assembled to the oil inlet.

7. The hydraulic brake device for a bicycle as claimed in claim 5, wherein a plurality of U-shaped portions is extruded from the film member toward the oil storage room.

8. The hydraulic brake device for a bicycle as claimed in claim 1, wherein each oil tank has a tubing member assembled thereon; each brake cable passes through each corresponding tubing member to assemble with each corresponding operating bar.

9. The hydraulic brake device for a bicycle as claimed in claim 1, wherein each operating bar has a through hole axially opened thereon; the brake cable is inserted into the through hole from one end of each operating bar and is fastened with another end of each operating bar.

\* \* \* \* \*